United States Patent [19]

Miyake et al.

[11] Patent Number: 5,302,008
[45] Date of Patent: Apr. 12, 1994

[54] FAIL-SAFE SYSTEM AND BRAKE ACTUATING APPARATUS FOR A VEHICULAR BRAKE CONTROL APPARATUS

[75] Inventors: Katsuya Miyake; Tatsuo Ogawahara, both of Saitama; Takashi Kunimi, Tokyo; Tadashi Kobayashi, Saitama; Masahiro Nezu, Saitama; Kimio Takahashi, Saitama; Masatomo Mori, Chiba; Takashi Kurosawa, Saitama, all of Japan

[73] Assignees: Akebono Brake Industry Co., Ltd., Tokyo; Akebono Research and Development Centre Ltd., Saitama, both of Japan

[21] Appl. No.: 941,272

[22] Filed: Sep. 4, 1992

[30] Foreign Application Priority Data

Sep. 6, 1991 [JP] Japan .................. 3-254256
Sep. 6, 1991 [JP] Japan .................. 3-254257

[51] Int. Cl.$^5$ ............................... B60T 8/32
[52] U.S. Cl. ........................ 303/14; 60/545;
 188/156; 188/162; 188/106 P; 303/15; 303/20;
 303/115.2; 303/DIG. 4; 303/113.4
[58] Field of Search ............ 303/14, 15, 13, 93,
 303/115.2, 119.1, DIG. 3, DIG. 4, 113.4, 101,
 113.2, 113.1, 3, 9.61, 6.01, 92, 9, 18, 20;
 188/162, 156, 106 R, 106 P, 106 A, 72.1, 72.8,
 72.6, 161, 163; 60/545

[56] References Cited

U.S. PATENT DOCUMENTS

| 3,827,758 | 8/1974 | Hansen | 188/156 X |
|---|---|---|---|
| 4,602,702 | 7/1986 | Ohta et al. | 188/106 P X |
| 4,653,815 | 3/1987 | Agarwal et al. | 303/115.2 X |
| 4,658,939 | 4/1987 | Kircher et al. | 188/72.8 X |
| 4,802,562 | 2/1989 | Kuroyanagi et al. | |
| 4,812,777 | 3/1989 | Shirai | 303/14 |
| 4,861,115 | 8/1989 | Petersen | 303/14 X |
| 4,902,075 | 2/1990 | Uno et al. | 303/14 |
| 4,950,028 | 8/1990 | Harrison | 303/115.2 X |
| 5,000,519 | 3/1991 | Moore | 303/20 X |
| 5,083,075 | 1/1992 | Sato et al. | 303/92 X |
| 5,186,525 | 2/1993 | Sato et al. | 303/92 X |

FOREIGN PATENT DOCUMENTS

| 52-43930 | 4/1977 | Japan | 188/156 |
|---|---|---|---|
| 2-267056 | 10/1990 | Japan | . |
| 2-279450 | 11/1990 | Japan | 303/113.4 |

*Primary Examiner*—Douglas C. Butler
*Attorney, Agent, or Firm*—Finnegan, Henderson, Farabow, Garrett & Dunner

[57] ABSTRACT

A brake control system for a vehicle in which a brake pressure is generated in accordance with a signal from an electronic control unit for applying the brake pressure to vehicle wheels, characterized in that a mechanical brake system is automatically actuated when an unexpected electrical fault has occurred in an electrical brake system.

16 Claims, 2 Drawing Sheets

FAIL-SAFE SYSTEM AND BRAKE ACTUATING APPARATUS FOR A VEHICULAR BRAKE CONTROL APPARATUS

BACKGROUND OF THE INVENTION

1. Field of the Invention

The present invention relates generally to a fail-safe system and brake actuating apparatus for a vehicular brake control apparatus, and particularly to a fail-safe system for a vehicular brake control apparatus having both an electric brake system so-called "by wire" type brake apparatus and an auxiliary mechanical brake system, capable of immediately actuating the mechanical brake system even when an unexpected fault was occurred in the electrical brake apparatus. More particularly, the invention relates to a brake actuating apparatus to which the above fail-safe system is applied.

2. Related Art

A conventional power brake control apparatus in which electric signals are employed for actuating the brake system is disclosed, for example, in U.S. Pat. No. 4,802,562 and Unexamined Japanese Patent Application (OPI) No. Hei. 2-267056. In these conventional brake apparatus of the by-wire type, a depressing force applied to or stroke of a brake pedal is detected by a sensor, and an electric control device controls a brake actuating apparatus in accordance with an output signal of the sensor, so that wheel cylinders disposed at vehicle wheels are supplied with a desired brake pressure.

The by-wire system of the brake apparatus as described, above is in fact advantageous in that it is readily applied to an anti-skid brake system and/or traction control system since the electric signals are applicable to various kinds of controls. Further, since the brake force control structure is relatively simple compared to the other brake control apparatus, the demand for this type of brake control apparatus will likely increase in future.

However, this type of brake control apparatus suffers from a problem that control is lost when an unexpected electrical defect occurs due to a fault of the sensor or a breakdown of electric wires, since the by-wire system brake apparatus electrically controls the whole the operational force for the brake control apparatus in accordance with the electric signal supplied from the sensor detecting the depressing force applied to or stroke of the brake pedal. This is different from the former conventional mechanical brake operating structure which does not depend on electrical signals. Accordingly, the conventional electrical brake actuating apparatus raises a serious problem in safety.

Further, in the brake actuating apparatus to which the by-wire type brake apparatus is applied, as disclosed in the U.S. Pat. No. 4,802,562 and Unexamined Japanese Patent Application (OPI) No. Hei. 2-267056, a spool valve or the like performs an initial operation and then the other piston is actuated to generate brake pressure. Accordingly, the structure is quite intricate.

SUMMARY OF THE INVENTION

The present invention was made in view of the foregoing difficulties or problems accompanying the conventional brake apparatus and, therefore, it is an object of the invention to provide a fail-safe brake system in which both the by-wire type system and mechanical brake system are assembled and capable of supplying a desired brake pressure even if an unexpected electrical defect has occurred in the electrical brake system.

It is another object of the invention to provide a brake actuating apparatus simple in structure and suitable for application in a fail-safe brake control system, which provides a great improvement in safety.

The above and other objects of the invention can be achieved by a provision of a brake control apparatus for a vehicle in which a brake pressure is generated in accordance with a signal from an electronic control unit for applying the brake pressure to vehicle wheels, characterized in that, according to the present invention, a mechanical brake control system is automatically actuated when an unexpected electrical fault has occurred in an electrical brake control system.

According to another aspect of the invention, the objects can be achieved by a provision of a brake control system for a vehicle in which a brake pressure is generated by a brake actuating apparatus in accordance with a signal from an electronic control unit for applying the brake pressure to vehicle wheels, characterized in that a solenoid valve communicating between a hydraulic pressure generating apparatus and a fluid passage is provided in the fluid passage communicating between the brake actuator and the wheel cylinders of the vehicle wheels. During an emergency, the solenoid valve is changed thereby to allow the hydraulic pressure generated in the hydraulic pressure generating apparatus to flow to the vehicle wheels.

During the normal operation in which the brake apparatus having the by-wire system is correctly operating the solenoid valve is at a first position. In this condition, the fluid passage connecting a master cylinder and the vehicle wheels is closed. Once an abnormal condition has occurred in the by-wire system, the solenoid valve is changed to a second position thereby allowing the master cylinder to communicate with the vehicle wheels, and the hydraulic pressure generated in the master cylinder is supplied to the vehicle wheels. Accordingly, while the solenoid valve assumes the first position, the brake actuating apparatus is operated by a signal from an electronic control unit so that the vehicle wheels are braked and, on the other hand, during emergency the solenoid valve is changed to the second position so that the hydraulic pressure generated by the master cylinder can brake the vehicle wheels.

DESCRIPTION OF THE PREFERRED EMBODIMENTS

The preferred embodiments of the present invention will now be described with reference to accompanying drawings.

Figure 1:
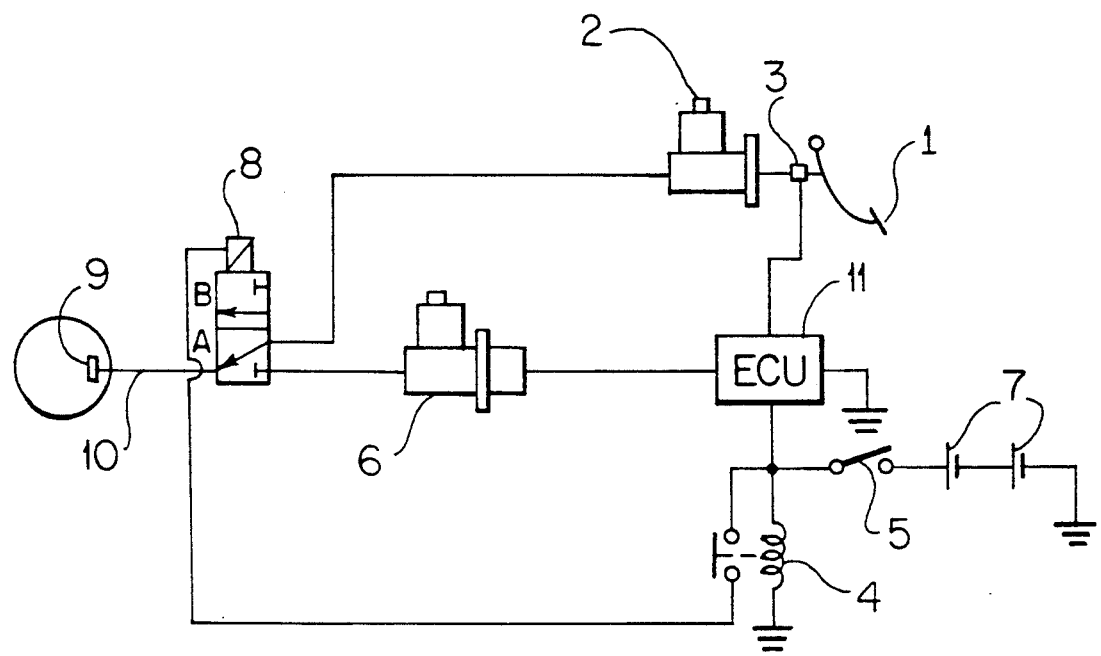
FIG. 1 is a diagram showing a concept of the fail-safe system for a vehicle brake control apparatus according to a first embodiment of the present invention.

FIG. 1 is a diagram showing a concept of the fail-safe system for a vehicle brake control apparatus according to a first embodiment of the present invention.

The fail-safe system of the first embodiment includes a brake pedal 1, a master cylinder performing as a hydraulic pressure generating apparatus and a sensor 3 for detecting a depressing force applied to the brake pedal 1. The master cylinder 2 connects to a fluid passage 10 at vehicle wheels (all wheels in this embodiment) 9 through a solenoid valve 8 changeable between positions A and B and having functions as set forth below. The fluid passage 10 also connects through the solenoid valve 8 to a brake actuating device 6, included in an electrical system, for generating a brake pressure. The structure of the brake actuating device 6 is described hereinbelow.

The solenoid valve 8 is electrically connected to a battery 7 mounted on the vehicle through a relay 4 and an ignition switch 5. When the ignition switch 5 is turned on, the relay 4 also turns on and the solenoid valve 8 is changed to its B position to allow the brake actuating device 6 to communicate with the fluid passage 10. When an abnormal condition is occurred in the above electric circuit, on the other hand, the relay 4 is not actuated and, accordingly, the solenoid valve 8 is changed to a position A because of a shut-off an electric power to the solenoid valve 8, so that the master cylinder 2 is allowed to communicate with the fluid passage 10. An electronic control unit (ECU) 11 is electrically connected to the sensor 3 for detecting a depressing force applied to the brake pedal 1, to the brake actuating device 6 and to the relay 4. When the sensor 3 outputs a signal corresponding to the depressing force applied to the brake pedal 1 to the ECU 11, the ECU 11 supplies an electric current in proportion to the output signal of the sensor 3 to the brake actuating device 6, and the brake actuating device 6 starts to generate a desired brake pressure to be supplied to the vehicle wheels 9.

As described above, while the brake apparatus is normally operating with the by-wire system, the solenoid valve 8 assumes its B position, and the brake actuating device 6 communicates with the fluid passage 10, whereas the communication between the master cylinder 2 and the fluid passage 10 is shut off. Thus, only the brake pressure generated in the brake actuating device 6 is supplied to the wheel cylinders thereby to brake the vehicle wheels 9. On the other hand, once the by-wire brake system becomes fault, i.e., if the voltage of the battery 7 falls down excessively, the relay 4 is not actuated. Therefore, the electric current does not flow from the battery 7 to the solenoid valve 8. As a result, the solenoid valve 8 is changed to its A position thereby to allow the master cylinder 2 to communicate with the fluid passage 10 so that the hydraulic pressure generated in the master cylinder 2 is supplied to brake the vehicle wheels 10.

In the first embodiment described above, the sensor 3 detects the depressing force applied to the brake pedal. However, the invention is not limited thereto or thereby. For example, another sensor for detecting a position of the brake pedal 1 such as a potentiometer associated with the brake pedal, or for detecting a stroke amount of the brake pedal utilizing a photodetectors may be employed.

The structure of the brake actuating device 6 will now be described with reference to FIG. 2.

Figure 2:
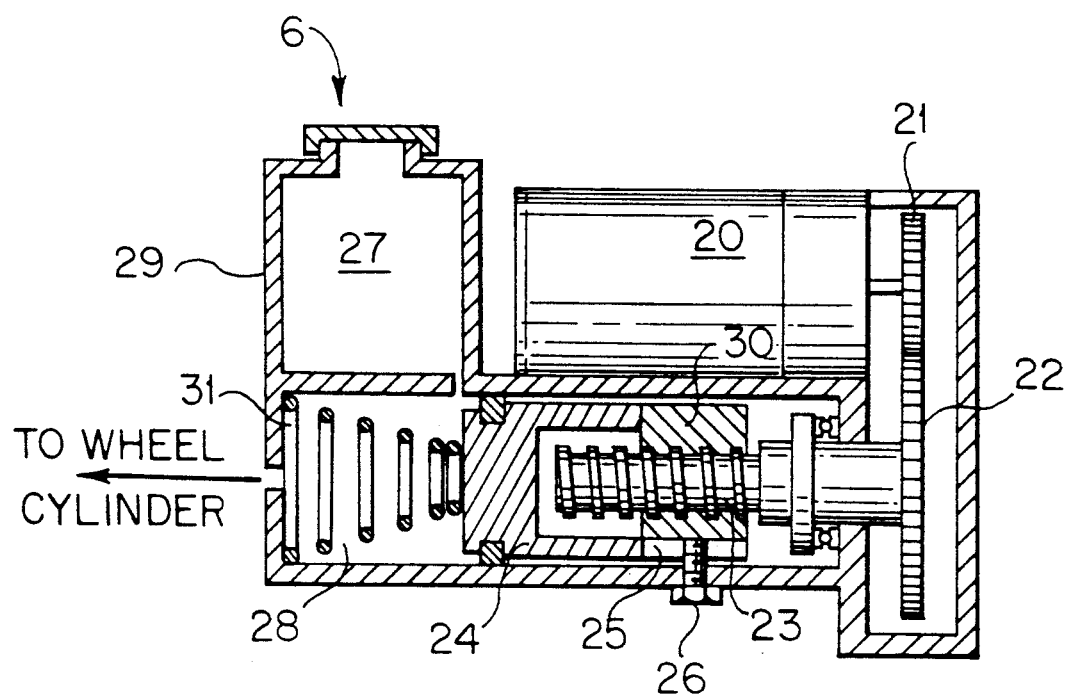
FIG. 2 is a sectional view showing a brake actuating apparatus according to the present invention.

FIG. 2 is a sectional view showing a brake actuating apparatus according to the present invention. As shown in FIG. 2, the brake actuating device 6 is provided with a motor 20, a pinion and a gear wheel 22 driven by the motor 20, a screw 23 secured to the gear wheel 22, a piston 24 driven by the screw 23, a hydraulic pressure generating chamber 28 for generating a hydraulic pressure in accordance with a movement of the piston 24, a reservoir 27 and a housing 29 for effectively accommodating these components. The piston 24 is slidably mounted in a cylinder portion formed inside the housing 29, and a nut 30 is threaded on the screw 23 and is fixed to the piston 24. The nut 30 is provided with a groove 25 along the axial direction of the screw 23 for receiving an element 26 to prevent the nut 30 from rotating even if the screw 23 rotates. The piston 24 is normally biased rightward in FIG. 2 by an elastic force of a spring 31.

With the arrangement of the brake actuating device 6 described above, when the motor 20 is actuated by a signal from the ECU 11 the pinion 21 and the gear wheel 22 rotate and the screw 23 also rotates. The rotary motion of the screw 23 is transmitted to the nut 30 which travels along the screw 23 leftward in FIG. 2 since its rotation is prevented by element 26. Since piston 24 is fixed to the nut 30, it also moves leftwardly in FIG. 2 against an elastic force of the spring 31 thereby to cause the hydraulic pressure generating chamber 28 to generate a desired hydraulic pressure. The hydraulic pressure generated in the hydraulic pressure generating chamber 28 is supplied to the vehicle wheels to brake. If the motor 20 stops, the driving force is not transmitted from the motor 20 to the screw 23 and, in this condition, the piston 24 is returned to its original rightward position by an elastic force of the spring 31. As described above, the brake actuating device 6 of the present invention can brake the vehicle wheels when the motor is actuated with the electrical system whereas the apparatus is also provided with the mechanical structure including the master cylinder.

The operation of the vehicular brake control apparatus of the present invention constructed as described above will now be described in detail, explaining both the condition with the by-wire system and the mechanical system.

Brake Control With By-Wire System

While the brake apparatus is normally operated by the by-wire (electrical) system, the solenoid valve 8 takes its B position because of the actuation of the relay 4, and the brake pressure is controlled by a signal from the ECU 11. During this condition, when the brake pedal 1 is depressed down and the sensor 3 detects a depressing force applied to or an amount of stroke of the brake pedal 1, the brake actuating device 6 is operated in accordance with the output signal of the ECU 11 as described above, so that the vehicle wheels 9 are appropriately braked. Thus, the brake pressure in this operation is electrically controlled by a signal from the sensor 3. The brake apparatus of the by-wire system changes the solenoid valve 8 from its B to A position immediately after a defect occurs in the signals form the sensor 3 or power from the battery 7, thereby changing the control system from the by-wire (electrical) to the mechanical system.

Brake Control With Mechanical System

When any defect occurs in the electrical system, the solenoid valve 8 is changed to the A position and, in this state, the hydraulic pressure generated in the master cylinder 2 is supplied to the vehicle wheels 9 to brake them.

While the brake control system is in a normal electrical operating mode, the master cylinder 2 generates a hydraulic pressure by depressing down the brake pedal 1. However, the hydraulic pressure may be recirculated to the reservoir 27 through a check valve (not shown in the figure) or the system may be arranged in such a manner that the hydraulic pressure is generated merely when the brake pedal exceeds a predetermined stroke value. Otherwise, an additional accumulator may be disposed between the solenoid valve 8 and the master cylinder 2. By one of these arrangements, the brake control apparatus does not suffer from a problem caused by the undesired hydraulic pressure generated by the master cylinder during the normal state (operation of the by-wire system). Further, in case that an accumulator is utilized, the hydraulic pressure may be utilized for traction control while controlling the solenoid valve 8.

Figure 3:
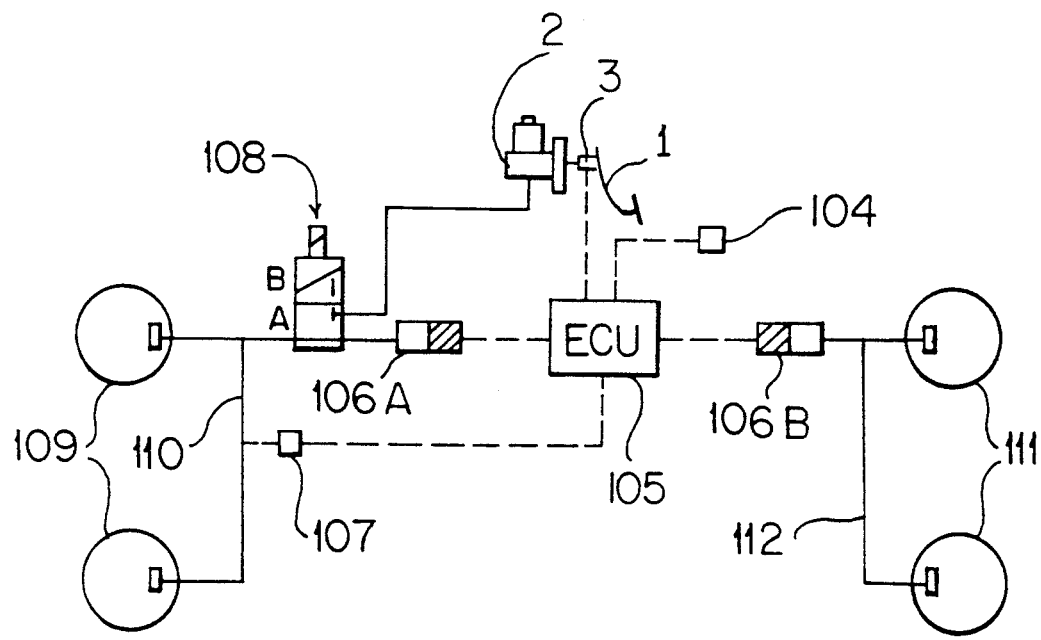
FIG. 3 is a diagram showing a concept of the fail-safe system for a vehicle brake control apparatus according to a second embodiment of the present invention.

FIG. 3 is a diagram showing a concept of the fail-safe system for a vehicle brake control apparatus according to a second embodiment of the present invention. Like parts and components of the second embodiment shown in FIG. 3 are designated by the same reference numerals as those of the first embodiment shown in FIG. 1.

In the fail-safe system of the second embodiment, the master cylinder 2 connects to a fluid passage 110 of a pair of vehicle wheels (front wheels in this embodiment) 109 through a solenoid valve 108 changing between positions A and B and having functions as set forth below. The fluid passage 110 also connects through the solenoid valve 108 to a first brake actuating device 106A generating a brake pressure in the by-wire system mode. Another pair of vehicle wheels 111 (rear wheels in this embodiment) connect to a second brake actuating device 106B through a fluid passage 112. The structure of the first and second brake actuating devices 106A and 106B of the second embodiment is the same as that of the brake actuating device of the first embodiment described above and shown in FIG. 2. Therefore, the description is omitted to avoid duplication.

The solenoid valve 108 takes its position A during a normal operating condition where the brake apparatus is controlled by the by-wire system, and the communication between the master cylinder 2 and the fluid passage 110 is shut off. When an abnormal condition occurs in the electric circuit, on the other hand, the solenoid valve 108 is changed to a position B to allow the master cylinder 2 to communicate with the fluid passage 110 and, accordingly the hydraulic pressure generated in the master cylinder 2 is supplied to the fluid passage 110. Thus, while the brake apparatus is normally operating in the by-wire system mode, the solenoid valve 108 assumes its A position as shown in FIG. 3, and the brake actuating devices 106A and 106B are operated by a signal from en electronic control unit (ECU) 105, so that the brake pressure is supplied to the vehicle wheels 109 and 111 to brake them. On the other hand, once the by-wire brake system becomes faulted, the solenoid valve 108 is changed to its B position, the master cylinder 2 is allowed to communicate with the fluid passage 110 so that the hydraulic pressure generated in the master cylinder 2 is supplied to brake the vehicle wheels 109.

The electronic control unit (ECU) 105 is connected to the sensor 3 for detecting a depressing force applied to or a stroke of the brake pedal 1, to the brake actuating devices 106A and 106B to and a fluid pressure sensor 107. The ECU 105 performs the following functions.

When the sensor 3 outputs a signal corresponding to the depressing force applied to or the amount of stroke of the brake pedal 1 to the ECU 105, the ECU supplies an electric current in proportion to the output signal of the sensor 3 to the brake actuating devices 106A and 106B, which start to generate a desired brake pressure to be supplied to the vehicle wheels 109 and 111. The ECU controls the brake actuating devices 106A and 106B in accordance with an output signal of the fluid pressure sensor, 7 during the control operation in the by-wire system mode and, further, changes the control system from the by-wire system to the mechanical brake system when an abnormal condition is occurred in the signal from the battery sensor 104 or in the by-wire system.

The operation of the vehicular brake control apparatus according to the second embodiment will now be described, explaining both the condition with the by-wire system and the mechanical system.

Brake Control With By-Wire System

While the brake control system normally operates with the by-wire (electrical) system, the brake pressure is controlled by a signal from the ECU 105. During this condition, when the brake pedal 1 is depressed down and the sensor 3 detects a depressing force applied to or an amount of stroke of the brake pedal 1, the brake actuating devices 106A and 106B are operated in accordance with the output signal of the ECU 105 described as above, so that the vehicle wheels 109 and 111 are appropriately braked. Thus, the brake pressure in this operation is electrically controlled by a signal from the sensor 3 or the fluid pressure sensor 107. The brake apparatus of the by-wire system changes the solenoid valve 108 immediately after an electrical defect occurs in the signals form the sensor 3, the battery sensor 104 or the fluid pressure sensor 107, thereby changing the control system from the by-wire (electrical) to the mechanical system.

Brake Control With Mechanical System

When any defect is occurs in the by-wire system, the solenoid valve 108 is changed from its A position to B position and, in this state, the hydraulic pressure generated in the master cylinder 2 is supplied to the vehicle wheels 109 to brake them.

Figure 4:
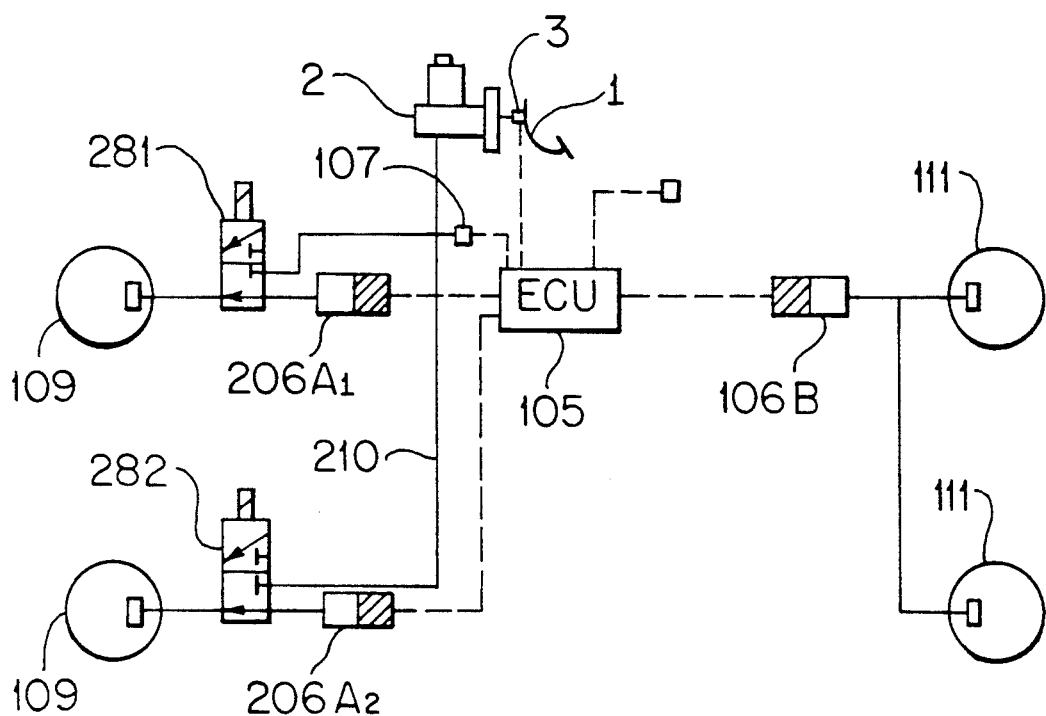
FIG. 4 is a diagram showing a concept of the fail-safe system for a vehicle brake control apparatus according to a third embodiment of the present invention.

FIG. 4 is a diagram showing a concept of the fail-safe system for a vehicle brake control apparatus according to a third embodiment of the present invention. Like parts and components of the second embodiment shown in FIG. 4 are designated by the same reference numerals as those of the first and second embodiments shown in FIGS. 1 and 3.

In the third embodiment, the primary differences from the second embodiment shown in FIG. 3 are that a fluid passage 210 communicating between the master cylinder 2 and vehicle wheels 109 is divided into two passages upstream of solenoid valves 281 and 282, and brake actuating devices $206A_1$ and $206A_2$ are provided on the respective passage. The other structures and components are the same as those of the second embodiment. In this embodiment, accordingly, the right and left vehicle wheels 109, 109 are independently controlled. This arrangement also demonstrates an improvement in safety.

As described above, in the vehicular brake control apparatus according to the present invention, the brake control is achieved by the electrical brake by-wire system in the normal condition, and the brake actuating apparatus can be operated by the mechanical brake control system once an unexpected electrical defect has occurred due to a fault of the sensor or breakdown of electric wires. Therefore, the brake actuating apparatus according to the invention is extremely improved in safety.

Further, according to the present invention, the motor is driven to slide the piston disposed in the cylinder thereby to supply a desired hydraulic pressure generated in the hydraulic pressure generating chamber. Accordingly, the brake actuating device is simple in structure.

The invention is not limited thereto or thereby. For example, the invention may employ another type of a brake actuating device in which a piston is operated by actuation of a linear motor, or a piston is operated by means of a piezoelectric element as disclosed in U.S. Pat. No. 4,802,562. Further, although the mechanical brake control system is applied merely to the front wheels in the present embodiments, it may also be applied to the whole wheels or only the rear wheels.

As described above, according to the present invention, in the fail-safe brake system both the by-wire type system and mechanical brake system are assembled and, accordingly, the brake control system is capable of supplying a desired brake pressure even if an unexpected electrical defect has occurred in the electrical brake system.

Further, according to the invention the brake actuating apparatus can be manufactured simple in structure.

What is claimed is:

1. A brake control system for a vehicle, comprising:
   a sensor for producing a first electric signal representing a status of a brake pedal of the vehicle;
   a master cylinder in which a first brake pressure is generated by actuation of the brake pedal;
   electric brake actuating means for generating a second brake pressure in response to a second electric signal;
   electric control means for generating said second electric signal and controlling said brake actuating means in accordance with said first electric signal produced by said sensor; and
   valve means communicating with vehicle brakes for operatively changing between a first position and a second position under the control of the electric control means, said valve means assumes said first position during normal conditions so that said second brake pressure generated by said brake actuating means is supplied to the vehicle brakes, and said valve means changes to said second position when an electrical defect has occurred so that communication between said brake actuating means and the vehicle brakes is shut off and said first brake pressure generated in the master cylinder is supplied to the vehicle brakes.

2. The brake controlling system of claim 1, wherein said valve means comprises a solenoid valve operated by a third electric signal.

3. The brake controlling system of claim 2, which further includes a relay, and wherein said solenoid valve is operated between a first and second position by a relay connected between said solenoid valve and a battery mounted on the vehicle.

4. The brake controlling system of claim 2, wherein said solenoid valve is operated by said electric control means.

5. The brake controlling system of claim 1, wherein said sensor detects a depressing force applied to the brake pedal.

6. The brake controlling system of claim 1, wherein said sensor detects an amount of stroke of the brake pedal.

7. The brake controlling system of claim 1, wherein said sensor detects a fluid pressure between said valve means the vehicle wheels.

8. The brake controlling system of claim 1, wherein said valve means comprises a single solenoid valve communicating both with left and right front brakes.

9. The brake controlling system of claim 1, wherein said valve means comprises a pair of solenoid valves communicating with a left and right front brakes, respectively.

10. The brake controlling system of claim 1, wherein said valve means comprises a single solenoid valve communicating with left and right rear brakes.

11. The brake controlling system of claim 1, wherein said valve means comprises a pair of solenoid valves communicating with a left and right rear brakes, respectively.

12. The brake controlling system of claim 1, further comprising a relay electrically connected between said valve means and a power source, said relay closing to electrically actuate said valve means to take said first position during the normal condition, and said relay opening when said electrical defect has occurred to cause said valve means to change to said second position, the opening and closing of said relay controlled by said electric control means.

13. The brake controlling system of claim 1, wherein said electric control means is an electronic control unit, and said electric brake actuating means comprises:
   an electric actuator operated by said second electric signal of said electronic control unit;
   a speed reducer connecting to said electric actuator for reducing a rotational speed of said electric actuator;
   a screw secured to said speed reducer, said screw rotating at a speed reduced by said speed reducer;
   a nut threaded on said screw, said nut travelling along on said screw when said screw rotates;
   a member for preventing said nut from rotating;
   a piston fixed to said nut and slidably moving with said nut; and
   a hydraulic pressure chamber for containing said second brake hydraulic generated pressure by a movement of said piston.

14. A brake controlling system brake controlling system for a vehicle having wheels to be braked, comprising:
   an electrical control system comprising:
      a sensor for detecting a condition of a brake pedal of the vehicle;
      an electronic control unit for receiving an output signal of said sensor; and
      a brake actuating means for generating a first brake pressure in accordance with a drive signal from said electronic control unit,
   a mechanical control system comprising a master cylinder for generating a second brake pressure by depressing a brake pedal of the vehicle, and
   means for selectively communicating said first brake pressure of said brake actuating means and said second brake pressure of said master cylinder to operate vehicle brakes, said selectively communicating means communicating said first brake pressure to the vehicle brakes during a normal condition and said second brake pressure of said master cylinder to the vehicle brakes during an abnormal condition when an electrical defect has occurred in said electrical control system.

15. The brake controlling system of claim 14, wherein said selectively communicating means is operated by said electronic control unit.

16. The brake controlling system of claim 14, wherein said selectively communicating means is operated by a relay connected between said selectively communicating means and a battery mounted on the vehicle.

* * * * *

UNITED STATES PATENT AND TRADEMARK OFFICE
CERTIFICATE OF CORRECTION

PATENT NO. : 5,302,008
DATED : April 12, 1994
INVENTOR(S) : Katsuya MIYAKE et al.

It is certified that error appears in the above-indentified patent and that said Letters Patent is hereby corrected as shown below:

Claim 7, Column 8, Line 9: After "means" insert --and--.

Claim 7, Column 8, Line 9: "wheels" should read --brakes--.

Claim 11, Column 8, Line 22: Delete "a".

Claim 14, Column 8, Lines 51 and 52: Delete "brake controlling system". (second occurence)

Signed and Sealed this

Thirty-first Day of January, 1995

Attest:

BRUCE LEHMAN

*Attesting Officer*     *Commissioner of Patents and Trademarks*